United States Patent
Brown et al.

(10) Patent No.: US 12,504,991 B1
(45) Date of Patent: Dec. 23, 2025

(54) WORKLOAD MEMORY MANAGEMENT TO ACHIEVE SERVICE LEVEL GOALS IN A HIGHLY CONCURRENT DATABASE SYSTEM EXECUTING IN A CLOUD AND/OR ON-PREM SYSTEMS

(71) Applicants: Douglas P. Brown, Rancho Santa Fe, CA (US); Venu Gopal Joshi, El Segundo, CA (US)

(72) Inventors: Douglas P. Brown, Rancho Santa Fe, CA (US); Venu Gopal Joshi, El Segundo, CA (US)

(73) Assignee: Teradata US, Inc., San Diego, CA (US)

( * ) Notice: Subject to any disclaimer, the term of this patent is extended or adjusted under 35 U.S.C. 154(b) by 882 days.

(21) Appl. No.: 17/538,538

(22) Filed: Nov. 30, 2021

(51) Int. Cl.
  *G06F 9/50* (2006.01)
(52) U.S. Cl.
  CPC .......... *G06F 9/5016* (2013.01); *G06F 9/5022* (2013.01); *G06F 9/5038* (2013.01); *G06F 9/505* (2013.01); *G06F 9/5077* (2013.01)
(58) Field of Classification Search
  CPC .... G06F 9/5016; G06F 9/5022; G06F 9/5038; G06F 9/505; G06F 9/5077
  USPC ......................................................... 718/104
  See application file for complete search history.

(56) References Cited

U.S. PATENT DOCUMENTS

| 9,298,506 | B2 | 3/2016 | Rabinovici et al. |
| 2002/0062435 | A1* | 5/2002 | Nemirovsky ......... G06F 9/3851 712/7 |
| 2005/0081210 | A1* | 4/2005 | Day ..................... G06F 9/5016 718/104 |

(Continued)

FOREIGN PATENT DOCUMENTS

| CN | 112581267 A | * | 3/2021 | ........... G06Q 20/356 |
| CN | 114443263 A | * | 5/2022 | ............. G06N 20/00 |

(Continued)

OTHER PUBLICATIONS

Paul Menage, Cgroups, Documentation/cgroup-v1/cpusets.txt, accessed at https://www.kernel.org/doc/Documentation/cgroup-v1/cgroups.txt on Nov. 28, 2021.

*Primary Examiner* — April Y Blair
*Assistant Examiner* — Ross Michael Vincent
(74) *Attorney, Agent, or Firm* — Howard Speight

(57) ABSTRACT

A memory management computer system arranges a set of consumers of a computer memory resource in an inverted tree hierarchy. The memory management computer system allocates the computer memory resource among the scheduling entities. Each of the scheduling entities allocates the computer memory resource among the consumers of the computer memory resource to which it is directly coupled in the hierarchy. One of the scheduling entities in the hierarchy, a modifying scheduling entity, determines that a change is required to the allocation of the computer memory resource to one of the consumers of the computer memory resource for which the modifying scheduling entity is responsible for (Continued)

allocating the computer memory resource. Modifying the allocation of the computer memory resource to the one of the consumers of the computer memory resource without changing the hierarchy or creating a new hierarchy.

9 Claims, 6 Drawing Sheets

(56) References Cited

U.S. PATENT DOCUMENTS

| | | | | |
|---|---|---|---|---|
| 2009/0249020 | A1* | 10/2009 | Vaidya | G06F 9/505 |
| | | | | 711/173 |
| 2015/0143381 | A1* | 5/2015 | Chin | G06F 9/505 |
| | | | | 718/104 |
| 2016/0380921 | A1* | 12/2016 | Blagodurov | G06F 3/067 |
| | | | | 709/226 |
| 2017/0093968 | A1* | 3/2017 | Chin | H04L 47/782 |
| 2017/0364392 | A1* | 12/2017 | Spivak | G06F 9/5083 |
| 2019/0171390 | A1* | 6/2019 | Freche | G06F 3/0659 |
| 2019/0311493 | A1* | 10/2019 | Hillborg | G06V 10/764 |
| 2021/0089686 | A1* | 3/2021 | He | G06F 1/1641 |
| 2022/0229695 | A1* | 7/2022 | Ferreira | G06F 9/5027 |

FOREIGN PATENT DOCUMENTS

| | | | | | |
|---|---|---|---|---|---|
| DE | 102018202432 | A1 | * | 8/2018 | H04L 47/805 |
| JP | 2015185883 | A | * | 10/2015 | |
| JP | 2019520646 | A | * | 7/2019 | H04L 67/60 |
| WO | WO 2022196889 | A1 | * | 9/2022 | G06F 9/5066 |

* cited by examiner

WORKLOAD MEMORY MANAGEMENT TO ACHIEVE SERVICE LEVEL GOALS IN A HIGHLY CONCURRENT DATABASE SYSTEM EXECUTING IN A CLOUD AND/OR ON-PREM SYSTEMS

BACKGROUND

Scheduling for very large database systems often involves monitoring workloads to try to ensure they adhere to the predefined service level goals (SLGs). These database systems often employ budget-based multi-tier priority differentiation mechanisms to classify their workloads and user requests. The tasks used to execute workloads and user requests may not behave as independent threads of activity: they may cooperate with each other, share resources, and in doing so interlock themselves in the so-called "Deadly Embrace," in which threads mutually stop making progress because they are waiting for each other to finish. Thus, in some of these circumstances, the ordinary rules of scheduling (e.g., giving tasks different priorities independent of other tasks) cannot be applied.

As system configurations (as measured by number of nodes and size of the data store) continue to grow year over year, and the compute and memory power of individual nodes also continues on an upward trend, users and administrators of the database system (or "system administrators") require the ability to configure how and when work applied to the database system is scheduled, such as distinguishing exigent work (e.g. tactical) from batch or interactive (e.g., web applications and batch processing). An additional requirement is that system administrators want the capability to arbitrarily partition the system according to some division schema (e.g., pay per use groups, etc.)

Determining the correct way to schedule these atomic system elements (i.e., lowest level elements that can be scheduled), fulfilling all these types of requests, is a very complex problem.

To summarize, the main requirements for the scheduler of a database system are:

1. Grouping the threads that are contributing to the same work (e.g., request) together and giving a share of the resources (memory, CPU, I/O bandwidth) to the collective.
2. Allowing users and system administrators to define types of work, the level at which that type of work is to be executed and the percentage of systems resources which can be allocated to that work.
3. Allowing a system administrator to partition the resources of the system according to some predetermined schema.

Cloud-based database vendors are increasingly offering pay-as-you-go pricing models as part of their as-a-Service (aaS) offerings. The recently introduced Teradata® Vantage Consumption™ feature is one such offering. While customers appreciate the flexibility provided by consumption-based pricing, they often find it difficult to predict the charges for new requests/queries/applications and have little insight on how to make them more cost efficient.

One of the most appealing features of cloud-based database systems is the elasticity these systems provide with respect to capacity and configuration. In some cases, the choice of configuration can have a significant impact on query pricing, so customers would benefit from features such as automated memory management (i.e., smart configurations).

Modern cloud databases that employ object storage (in which data and metadata regarding an object is stored as a unit and labeled with an object identifier, rather than in a hierarchical file structure) as their primary or secondary data sources are typically known to be aggressive in memory usage because of the high latency of the object storage layer and the inherent need to cache the objects in the compute layer. This adds even more challenges for workload management for cloud databases.

Database systems frequently encounter diverse and lower priority workloads that each require excessive amount of operating system memory (real and swap) and can cause high priority jobs to starve for this memory, and thereby miss their service level goals. Hence, there is a need to isolate the high priority requests from the memory pressure events caused by lower priority jobs. A priority-based workload memory management system would be useful in a highly concurrent database system that endeavors to provide deterministic and fair scheduling of user requests in the cloud or on-premises (or "on-prem").

SUMMARY

In one aspect, a computer-based method includes a memory management computer system arranging a set of consumers of a computer memory resource in an inverted tree hierarchy. The hierarchy includes a root, a plurality of branches, a plurality of leaves linked to the branches, and a scheduling entity at each location where a branch couples to the root or to another branch. Each branch is linked to the root or to another branch closer to the root in the hierarchy. Each leaf in the plurality of leaves is a member of the set of consumers of the computer memory resource. The memory management computer system allocates the computer memory resource among the scheduling entities. Each of the scheduling entities allocates the computer memory resource among the consumers of the computer memory resource to which it is directly coupled in the hierarchy. One of the scheduling entities in the hierarchy, a modifying scheduling entity, determines that a change is required to the allocation of the computer memory resource to one of the consumers of the computer memory resource for which the modifying scheduling entity is responsible for allocating the computer memory resource. The memory management computer system modifying the allocation of the computer memory resource to the one of the consumers of the computer memory resource without changing the hierarchy or creating a new hierarchy.

Implementations may include one or more of the following. Determining that a change is required to the allocation of the computer memory resource to the one of the consumers of the computer memory resource may include determining that the one of the consumers of the computer memory resource is consuming so much of the computer memory resource as to prevent meeting a performance goal by another consumer of the computer memory resource to which allocation of the computer memory resource is made by the modifying scheduling entity. Modifying the allocation of the computer memory resource to the one of the consumers of the computer memory resource may include temporarily increasing the allocation of the computer memory resource to the one of the consumers of the computer memory resource. Modifying the allocation of the computer memory resource to the one of the consumers of the computer memory resource may include reducing the allocation of the computer memory resource to the one of the consumers of the computer memory resource to zero. The allocation of the computer memory resource to the one of the consumers of the computer memory resource may be increased when another consumer of the computer memory resource to which allocation of the computer memory resource is made by the modifying scheduling entity is able to meet a performance goal. A branch coupled to the root in the hierarchy may be a partition. The scheduling entities may be control groups. The computer memory resource being allocated may be a priority of consuming the computer memory resource. The scheduling entities and leaves are allocated the priority of consuming computer memory in an amount that decreases as the distance along the hierarchy from the root increases.

In one aspect, a non-transitory computer-readable tangible medium has on it recorded a computer program. The computer program include executable instructions, that, when executed, perform a method. The method includes a memory management computer system arranging a set of consumers of a computer memory resource in an inverted tree hierarchy. The hierarchy has a root, a plurality of branches, a plurality of leaves linked to the branches, and a scheduling entity at each location where a branch couples to the root or to another branch. Each branch is linked to the root or to another branch closer to the root in the hierarchy. Each leaf in the plurality of leaves is a member of the set of consumers of the computer memory resource. The memory management computer system allocates the computer memory resource among the scheduling entities. Each of the scheduling entities allocates the computer memory resource among the consumers of the computer memory resource to which it is directly coupled in the hierarchy. One of the scheduling entities in the hierarchy, a modifying scheduling entity, determines that a change is required to the allocation of the computer memory resource to one of the consumers of the computer memory resource for which the modifying scheduling entity is responsible for allocating the computer memory resource. The memory management computer system modifying the allocation of the computer memory resource to the one of the consumers of the computer memory resource without changing the hierarchy or creating a new hierarchy.

In one aspect, an apparatus includes a memory management computer system arranging a set of consumers of a computer memory resource in an inverted tree hierarchy. The hierarchy has a root, a plurality of branches, a plurality of leaves linked to the branches, and a scheduling entity at each location where a branch couples to the root or to another branch. Each branch is linked to the root or to another branch closer to the root in the hierarchy. Each leaf in the plurality of leaves is a member of the set of consumers of the computer memory resource. The memory management computer system allocates the computer memory resource among the scheduling entities. Each of the scheduling entities allocates the computer memory resource among the consumers of the computer memory resource to which it is directly coupled in the hierarchy. One of the scheduling entities in the hierarchy, a modifying scheduling entity, determines that a change is required to the allocation of the computer memory resource to one of the consumers of the computer memory resource for which the modifying scheduling entity is responsible for allocating the computer memory resource. The memory management computer system modifying the allocation of the computer memory resource to the one of the consumers of the computer memory resource without changing the hierarchy or creating a new hierarchy.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
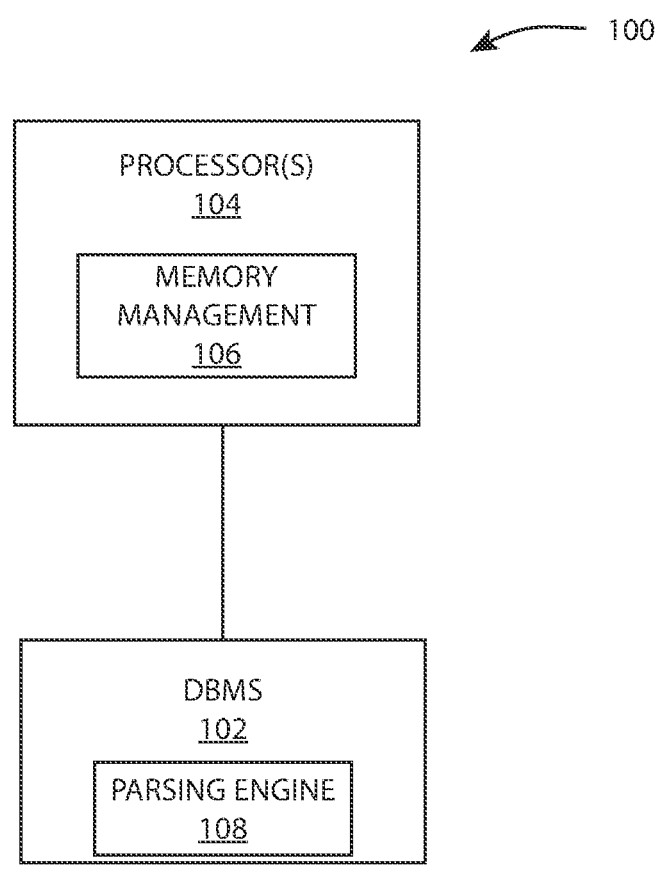
FIG. 1 is one example of a block diagram of a computer system.

The techniques disclosed herein have particular application to, but are not limited to, systems such as the system 100 illustrated in FIG. 1. The system 100 includes a variety of hardware components and software components that may be deployed on an appliance, on commodity hardware, in a private cloud, in a public cloud, or in a combination thereof. The software components are programmed as executable instructions into memory and/or a non-transitory computer-readable medium for execution on the hardware components (including, for example, hardware processors). The system 100 includes one or more network connections; the networks can be wired, wireless, or a combination of wired and wireless.

The system 100 implements, among other things, the processing described below in connection with FIGS. 1-6

An Example Database Management System

The system 100 includes a Database Management System (DBMS) 102, at least one hardware processor 104, and a non-transitory computer-readable storage medium having executable instructions representing a memory management technique 106 as disclosed herein. The DBMS may be a relational DBMS (RDBMS) or it may be another variety of database management system.

The DBMS 102 may include a parsing engine 108, discussed below in connection with FIGS. 2 and 3, that organizes the storage of data and the distribution of database table rows and coordinates the retrieval of data from the data-storage facilities in response to queries received from a user. The DBMS 100 usually receives queries and commands to build tables in a standard format, such as Structured Query Language (SQL).

Figure 2:
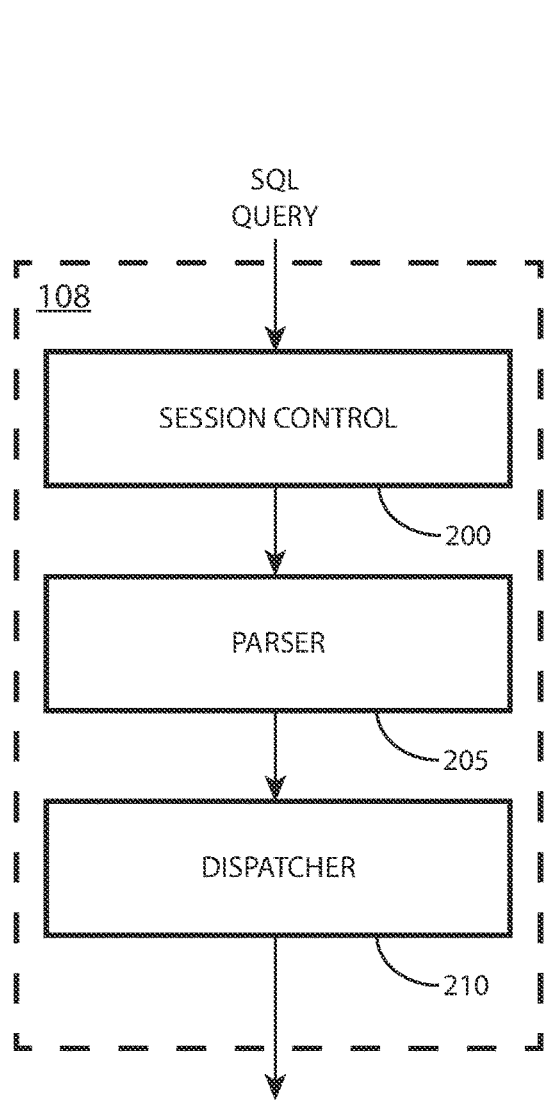
FIG. 2 is one example of a block diagram of a parsing engine.
Figure 3:
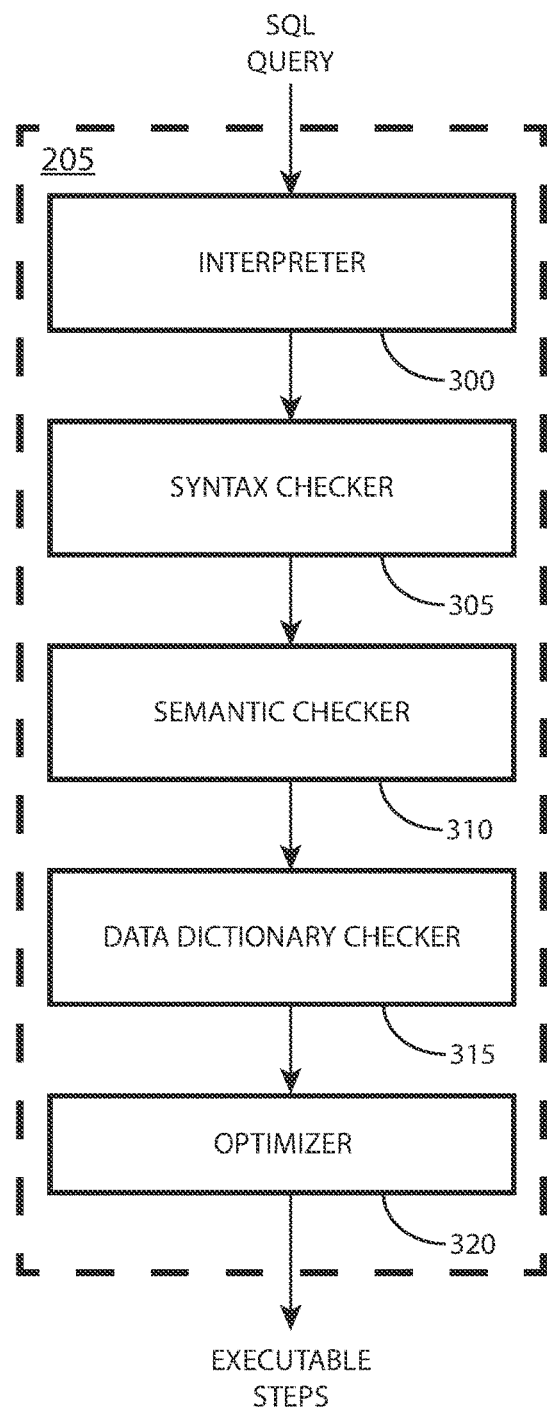
FIG. 3 is one example of a block diagram of a parser.

Once the session control 200, shown in FIG. 2, allows a session to begin, a user may submit a SQL query. More broadly, the user may submit a "request," a term that includes database queries, which are processed by the DBMS to produce an output result, and other DBMS actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

The SQL query is routed to the parser 205. As illustrated in FIG. 3, the parser 205 interprets the SQL query 300, checks it for proper SQL syntax 305, evaluates it semantically 310, and consults a data dictionary to ensure that all the objects specified in the SQL query actually exist and that the user has the authority to perform the request 315. Finally, the parser 205 runs an optimizer 320, which develops a query execution plan (QEP) to perform the query and produces executable steps to execute the QEP. A dispatcher 210 issues commands to implement the executable steps.

A "workload group" (or alternatively "workload") is a set of requests that have common characteristics, such as an application that issued the requests, a source of the requests, type of query, priority, response time goals, throughput, etc. A workload group is defined by a workload definition (WD), which defines characteristics of the workload group as well as various rules associated with the workload group.

Workload groups may be divided into workload groups of different priorities. A low priority workload group may include low priority requests such as background load requests or reporting requests. Another type of workload group may include requests that have short durations but high priorities. Another type of workload group may include continuous or batch requests, which run for a relatively long time. Yet another type of workload group may be cognizant of the relative cost of the requests, meaning lowest price available is desired, and yet another may only care about getting the request done by a certain date and/or time i.e., deadline management.

An Example Memory Management Controller

A hierarchical inverted tree-based memory management controller that is organized by having high priority tasks at the top tiers and lower priority tasks at the bottom tiers. The lower tiers are set with memory limits that throttle tasks when they attempt to consume more than the preset values. The higher tiers can continue to have a higher limit for memory utilization and thereby achieve SLG goals without being starved by any memory-hungry low-priority workloads running concurrently. Further, to prevent priority inversion issues, where a low priority task is severely throttled but still holds critical shared locks to block a high priority task, an additional mechanism of migrating the low priority task temporarily to a higher tier just long enough for it to complete the critical region code processing is provided. This combination makes available an ambient amount of computer memory resources to the high priority jobs. When the high priority jobs are dormant, the low priority jobs can consume more computer memory resources outside the soft memory limits imposed on them.

Such a memory management controller provides improved consistency and predictability of the user queries and facilitates an easier scheduling configuration. The memory management controller will also benefit the modern cloud database system that relies heavily on native object store as part of their workload mix, as these tend to be very memory intensive in nature, typically to offset the reduced latency of the object store and compute node memory cache usage.

The hierarchical design of a database scheduler, as described in U.S. Pat. No. 9,298,506, entitled "Assigning resources among multiple task groups in a database system," issued on Mar. 29, 2016, incorporated by reference, provides the framework for this solution to be implemented.

Figure 4:
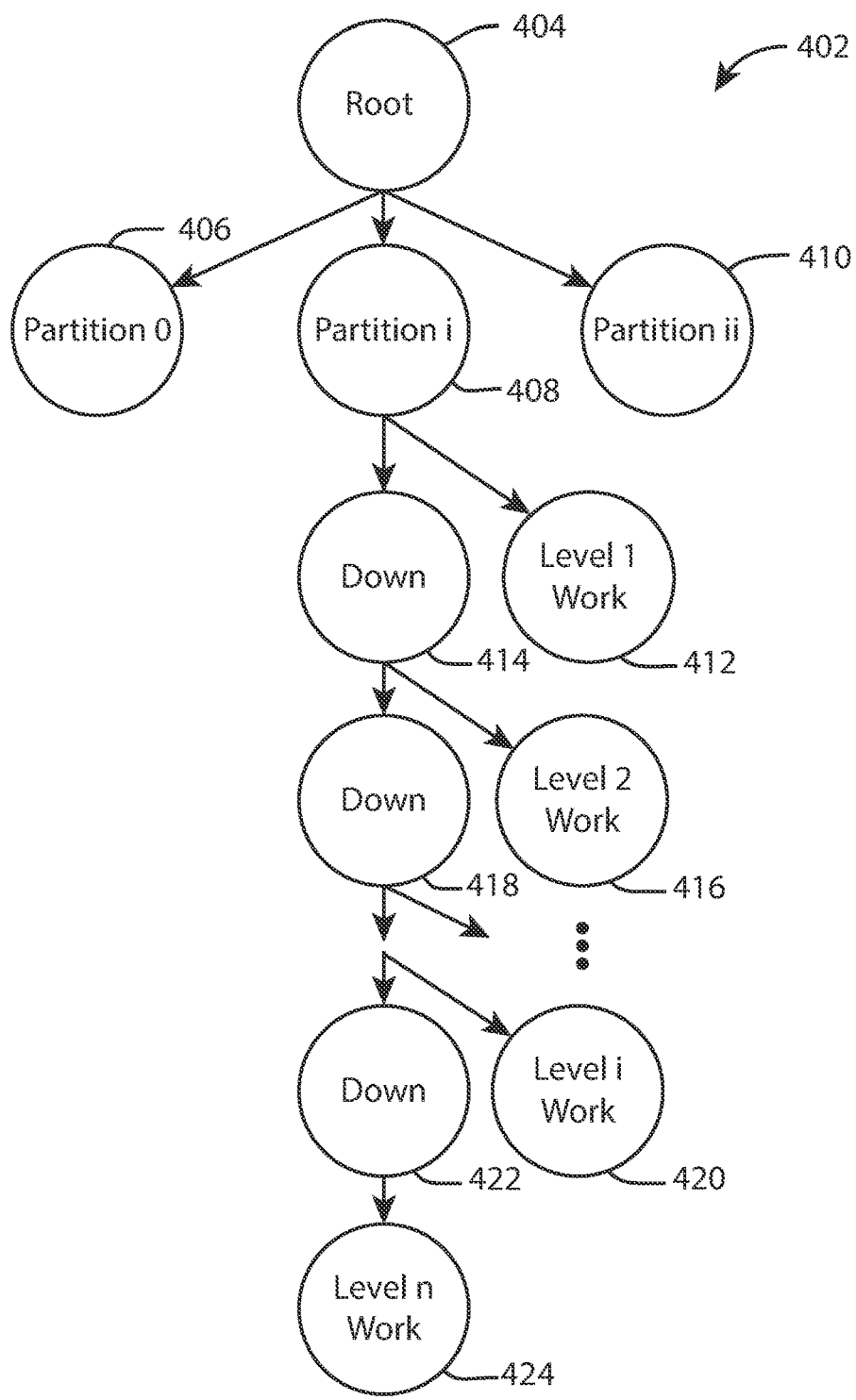
FIG. 4 is one example of the layout of an inverted tree scheduler control group-based database system.

FIG. 4 is one example of the layout of an inverted tree scheduler control-group-based database system. The example inverted tree scheduler control-group-based database system 402 includes a root node 404, which manages available resources. The root node 404 allocates the available resources among partitions, e.g., partition 0 406, partition i 408, and partition ii 410. Each of the partitions 406, 408, 410 manages the resources that have been allocated to it. For example, partition i allocates a portion of the resources under its control to satisfy the requirements of level 1 work 412 and allocates the remainder to a down controller 414, which performs further lower-level allocations. The down controller 414 allocates a portion of the resources under its control to satisfy the requirements of level 2 work 416 and allocates the remainder to a down controller 418. This down allocation continues (as indicated by the ellipsis) to a portion of the resources being allocated to satisfy the requirements of level i work 420 422 and the remainder being allocated to down controller 422. The down controller 422 allocates its assigned resources to level n work 424. As can be seen, the availability of resources (e.g., central processing unit (CPU), input/output (I/O), memory, etc.) flows downward after satisfying the resource requirements defined by the weightage assigned at each tier.

The higher priority work resides at the upper tiers and any remaining resources after the higher priority work have been granted their due share will be available to the lower tiers.

Figure 5A:
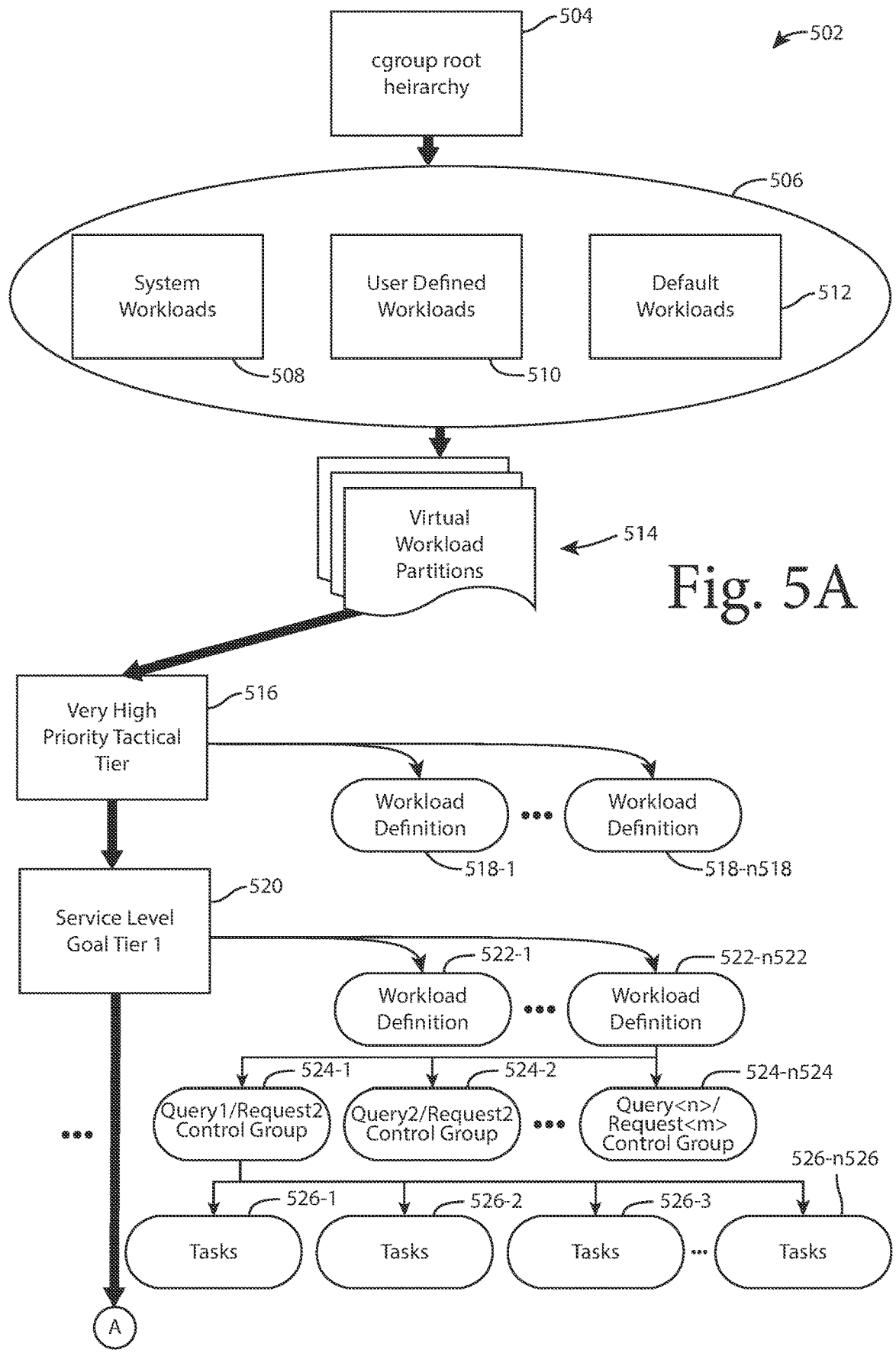
FIGS. 5A and 5B illustrate one example of a tree structure for scheduling entities.
Figure 5B:
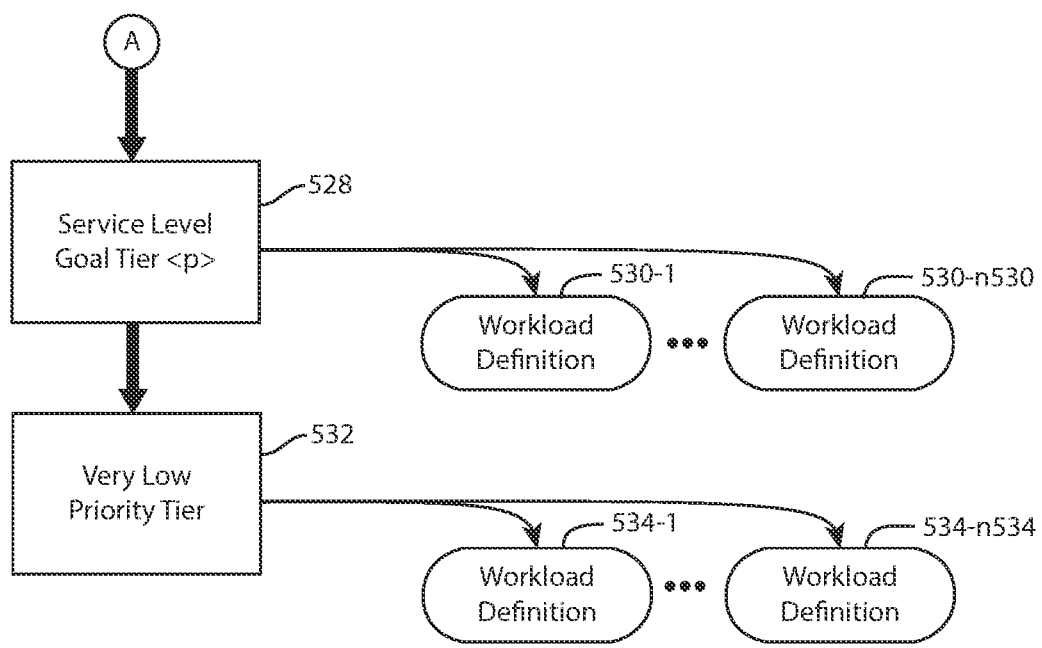

FIGS. 5A and 5B illustrate one example of a tree structure for scheduling entities. A scheduling entity is defined to be a computer process that allocates and manages a resource, such as a computer memory resource, among a group of one or more computer processes that consume the resource. The scheduling entity may allocate a portion of the resource to its own use. One or more of the group of one or more computer processes being managed by the scheduling entity may itself be a scheduling entity.

One example of a scheduling entity is a Linux control group (or "cgroup"), which is defined at www.kernel.org/doc/Documentation/cgroup.vl/cgroups.txt, incorporated by reference, as "provid [ing] a mechanism for aggregating/partitioning sets of tasks, and all their future children, into hierarchical groups with specialized behaviour [British spelling in original]". While some of the examples described below employ Linux control groups, this should not be viewed as a limit on scheduling entities. Other kinds of scheduling entities are possible and fall within the scope of the claims appended hereto.

In a Linux cgroup example, tasks that perform work for a specific user query or request may be grouped under scheduling entities, such as cgroups, and laid out in a tree structure. Based on the workload on a system, several cgroups may be active at different levels or tiers on the system. Their position in the hierarchy determines their scheduling priority (higher tiers getting higher priority access to the system resources than lower tiers). For example, in the hierarchical tree structure 502 shown in FIG.

5A, a cgroup root hierarchy 504 manages a set of workloads 506 that includes system workloads 508, user defined workloads 510, and default workloads 512. Management of those workloads 506 may be divided among a plurality of virtual workload partitions 514, as discussed below. The tree structure for one of the virtual workload partitions is shown in FIGS. 5A and 5B. The tree structures for the other virtual workload partitions may be similar. The hierarchical tree structure 502 includes a root, branches that originate at the root or at other branches, and leaves that do not originate separate branches.

One example virtual workload partition 514 may include a very high priority tactical tier cgroup 516, which may manage a plurality of workload definitions 518-1 . . . 518-$n$518, where n518 is the number of workload definitions being managed under the very high priority tactical tier cgroup 516. The very high priority tactical tier cgroup 516 may, upon satisfying its own needs for the computer memory resource, allocate the remaining computer memory resource to a service level goal tier 1 cgroup 520, which may manage a plurality of workload definitions 522-1 . . . 522-$n$522, where n522 is the number of workload definitions being managed under the service level goal tier 1 cgroup 520. One or more of the workloads, e.g. workload definition 522-$n$522, being managed by the service level goal tier 1 cgroup 520, may itself be a cgroup managing, for example a plurality of control groups, query1/request2 control group 524-1, query2/request2 control group 524-2, through query<n>/request<m 524-$n$524, where n524 is the number of control groups being managed by workload definition 522-$n$522. One or more of the control groups 524-1, 524-2, . . . , 524-$n$524 may manage a group of database tasks 526-1, 526-2, 526-3, . . . , 526-$n$526 (e.g., database tasks being used to process a database query; for example, Teradata refers to such tasks as AMP (Access Module Processor) worker tasks (AWT)), where n526 is the number of tasks being managed. The service level goal tier 1 cgroup 520 may, upon satisfying its own needs for the computer memory resource, allocate the remaining computer memory resource down the hierarchy, represented by an ellipsis, to service level goal tier <p> cgroup 528, shown in FIG. 5B, which may manage a plurality of workload definitions 530-1 . . . 530-$n$530, where p is the number of service level goal tiers cgroups and n530 is the number of workload definitions being managed under the service level goal tier 1 cgroup 528. The structure under service level tier <p> 528 or any of the other service level tiers may be similar to that under service level goal tier 1 520. The service level goal tier <p> cgroup may, upon satisfying its own needs for the computer memory resource, allocate the remaining computer memory resource toa very low priority tier cgroup 532, shown in FIG. 5B, which may manage a plurality of workload definitions 534-1 . . . 534-$n$534, where n534 is the number of workload definitions being managed under the very low priority tier 1 cgroup 532.

For example, workload definitions 522-1 through 522-$n$522 are all at the same tier in the tree structure shown in FIGS. 5A and 5B. Similarly, workload definitions 530-1 through 530-$n$530 are all at the same tier and workload definitions 534-1 through 534-$n$534 are all at the same tier. Workload definitions 522-1 through 522-$n$522 are at a higher tier than workload definitions 530-1 through 530-$n$530, which, in turn, are at a higher tier than workload definitions 534-1 through 534-$n$534. As such, workload definitions 522-1 through 522-$n$522 have a higher priority for allocation of computer memory resources than workload definitions 530-1 through 530-$n$530, which, in turn, have a higher priority for allocation of computer memory resources than workload definitions 534-1 through 534-$n$534.

In the example shown in FIGS. 5A and 5B, the cgroup root hierarchy 504 is the root. The hierarchical tree 502 branches at the virtual workload partitions 514, the very high priority tactical tier 516, etc., and the leaves are the workload definitions 518-1 through 518-$n$518, the tasks 526-1 through 526-$n$526, etc. The root, the points in the hierarchical tree where the branching occurs, and the leaves are "nodes" in the hierarchical tree. The light lines between the nodes indicate control. For example, the light lines between very high priority tactical tier 516 and workload definitions 518-1 through 518-$n$518 indicate that the very high priority tactical tier control group 516 controls some aspect of workload definitions 518-1 through 518-$n$518. In particular, for the purposes of this application, the very high priority tactical tier 516 control group, which receives its allocations from the virtual workload partitions 514 as indicated by the heavy line on FIG. 5A, allocates and assigns a computer memory resource among workload definitions 518-1 through 518-n518. The computer memory resource may be physical memory, such as random access memory (RAM) or sequential memory or the like, virtual memory such as swap space on a disk drive or the like, or any other type of memory and may reside on-prem, in the cloud, or in a hybrid combination of cloud and on-prem. Similarly, other branching points have the same type of control over hierarchically lower elements in the hierarchical tree but not over elements that are lower in the hierarchical tree but not in the same hierarchy. For example, workload definition 522-n522 has control over aspects of quer1/request2 control group 524-1, query2/request2 control group 524-2 through query<n>/request<m> control group 524-n524 because they are hierarchically below workload definition 522-n522, but not over any workloads or control groups that are subordinate to workload definition 522-1 because the hierarchical relationship is missing for those nodes in the hierarchical tree 502.

The nodes in the tree structures can be given tier-based relative weightage by the system administrator to allow finer control on the available resources on any tier in the tree structure as well as controlling the unused and left-over resources that flow to the lower tiers after the top tiers have used their allotted share of the system resources. By changing the relative weightage of a control group, more resources can be assigned to a scheduling group at the expense of another control group residing at the same level in the tree. This can be helpful when a critical user query/request is competing with other request(s) at the same or lower level.

For example, workload definitions 530-1 through 530-n530, which are all at the same tier, may be assigned different weightages, causing workload definitions with higher weightages to have greater priority for assigning computer memory resources than those with lower weightages. Assume, for purposes of illustration, that n-530=3 (i.e., that there are 3 workload definitions in this tier) and that the weightages are as follows:

workload definition 530-1: weightage 60 percent
workload definition 530-2: weightage 30 percent
workload definition 530-3: weightage 10 percent In this example, workload definition 530-1 would be allocated 60 percent of the computer memory resource allocated to that tier (i.e., the tier including workload definitions 530-1, 530-2, and 530-3), workload definition 530-2 would be allocated 30 percent of the computer memory resource allocated to that tier, and workload definition 530-3 would be allocated 10 percent of the computer memory resource allocated to that tier.

Computer memory resources are divided among the branches of the tree as they branch downward through the tree from control group to control group. For example, the virtual workload partitions 514 may be allocated different amounts of computer memory resources depending on the priority of the work to be run within each partition. The computer memory resources allocated to the very high priority tactical tier 516 by the virtual workload partitions 514 as indicated by the heavy line on FIG. 5A are divided among the workload definitions 518-1 through 518-n518.

The computer memory resources allocated to service level goal tier 1 520 by the very high priority tactical tier cgroup 516 as indicated by the heavy line on FIG. 5A are divided among the workload definitions 522-1 through 522-522n according to the weightages they have been assigned. In the example shown in FIGS. 5A and 5B, the computer memory resources allocated to workload definition 522-n522 are divided among query1/request2 control group 524-1, query2/request2 control group 524-2, through query<n>/request<m> control group 524-n524 according to the weightages they have been assigned.

In the example shown in FIGS. 5A and 5B, the computer memory resources allocated to query1/request2 control group 524-1 are divided among tasks 526-1, tasks 526-2, tasks 526-3, through tasks 526-n526 according to the weightages they have been assigned.

The limits applied to the control groups and tasks, such as those illustrated in FIGS. 5A and 5B, are called "soft memory limits" because the limits can be changed over time within the same hierarchy as the resource demands of each node in the hierarchy changes. That is, in the technique described herein, the computer memory resource limits for each node can be changed without changing the hierarchy or without having to create a new hierarchy. The use of soft memory limits and out of memory controls can help manage the tasks that are over consuming by effectively pausing them until the memory condition eases (often by other tasks in the same group releasing their memory). For example, assume that tasks 526-1, 526-2, 526-3, through 526-n526 are running under query1/request2 control group 524-1 without memory controls, i.e., such that any of the tasks can consume the computer memory resource allocated to query1/request2 control group 524-1 without limits. Assume also that one of the tasks, say task 526-2 is over-consuming memory, causing the other tasks to underperform and perhaps miss performance goals. In that case, the query1/request2 control group 524-1 may, either automatically or through intervention of the system administrator, reduce or eliminate the amount of computer memory resource available to task 526-2 until the other tasks recover and are able to reach their service goals or until a similar service threshold is met.

This mechanism can be utilized to arrange a group of database tasks in a hierarchical order where the lower level have these limits specified in proportion to the priority of the tasks that would run under these groups. Further, in another embodiment, the very high priority tactical tier 516 could manage the nodes below it in the hierarchy, for example by reserving a major portion of its allocation, say 80 percent, for its children and its workload definitions, workload definitions 518-1 through 518-n518, and allocate the remaining for the lower tiers, i.e., the service level goal tier 1 520 and its children through service level goal tier <n> and its children, and the very low priority tier 532 and its children. Similarly, the other tiers would reserve their soft limits accordingly.

The allocation illustrated in the hierarchy of FIGS. 5A and 5B may be of priority rather than an allocation of the computer memory resource itself. That is, the higher nodes in the hierarchy will have a high priority in the assignment of the computer memory resources and the lower nodes in the hierarchy will have a low priority. This allows the possibility of the lower nodes having more of the computer memory resource available if the upper nodes are dormant or not using their allotted share of the computer memory resource.

As an example, the priorities attached to each node may be have a notation such as p1.p2 ... pn−1, where n−1 is the number of levels of priority. In this example, the following priorities may be assigned:

very high priority tactical tier 516: priority 1
service level goal tier 1 520: priority 2
...
service level goal tier n 528: priority n
very low priority tier 532: priority n+1

In this scheme, the lower the priority number, the greater the priority the node to which the priority number is attached. That is, very high priority tactical tier 516 with priority 1 has priority over all nodes with higher priority numbers—that is, the list above is in order from highest priority to lowest priority. Note that with this notation, the priority hierarchy can be changed easily by changing the priority number. For example, the service level goal tier 1 520 can be interchanged with the service level goal tier n by interchanging their priority numbers.

In this notation example, priorities for the sub-tree nodes would indicate the parent node. For example, the nodes shown in FIGS. 5A and 5B, may have the priorities shown below:

workload definition 518-1: priority 1.1
workload definition 518-2: priority 1.1
workload definition 522-1: priority 2.1
workload definition 522-n522: priority 2.1
query1/request2 control group 524-1: priority 2.1.1
query2/request2 control group 524-2: priority 2.1.1
query<n>/request<m> control group 524-n524: priority 2.1.1
task 526-1: priority 2.1.1.1
task 526-2: priority 2.1.1.1
task 526-3: priority 2.1.1.1
task 526-n526: priority 2.1.1.1
workload definition 530-1: priority 3.1
workload definition 530-n530: priority 3.1
workload definition 534-1: priority 4.1
workload definition 534-n534: priority 4.1

As before, the priority for each node is established by the value of the first element in the priority number, followed by the value of the second element in the priority number, and so on. So, nodes with priority numbers having "1" in the first element in the priority number have greater priority than all nodes with priority numbers having higher numbers (greater than 1) in the first element in the priority number.

In another notation example, the notation reflects the structure of the hierarchical tree, as shown below for the example hierarchical tree illustrated in FIGS. 5A and 5B:

very high priority tactical tier 516: priority 1
workload definition 518-1: priority 1.1 (priority flows from node 516)
workload definition 518-n518: priority 1.1 (priority flows from node 516)
service level goal tier 1 520: priority 1.2 (priority flows from node 516)

workload definition 522-1: priority 1.2.1 (priority flows from node 520)

workload definition 522-n522: priority 1.2.1 (priority flows from node 520)

query1/request2 control group 524-1: priority 1.2.1.1 (priority flows from node 522-n522)

query2/request2 control group 524-2: priority 1.2.1.1 (priority flows from node 522-n522)

query<n>/request<m> control group 524-n524: priority 1.2.1.1 (priority flows from node 522-n522)

task 526-1: priority 1.2.1.1.1 (priority flows from node 524-1)

task 526-2: priority 1.2.1.1.1 (priority flows from node 524-1)

task 526-3: priority 1.2.1.1.1 (priority flows from node 524-1)

task 526-n526: priority 1.2.1.1.1 (priority flows from node 524-1)

. . .

service level goal tier n 528: priority 1.2.n (priority flows from unseen node)

workload definition 530-1: priority 1.2.n.1 (priority flows from node 528)

workload definition 530-n530: priority 1.2.n.1 (priority flows from node 528)

very low priority tier 532: priority 1.2.n.2 (priority flows from node 528) workload definition 534-1: priority 1.2.n.2.1 (priority flows from node 532) workload definition 534-n534: priority 1.2.n.2.1 (priority flows from node 532)

In this notation, the priority is evaluated from left to right. That is, the priority for a node is determined in order by the value of the first element, the value of the second element (if present), the value of the third element (if present), and so on. As such, a priority 1.1 is of greater priority than a priority 1.2 and a priority 1.2.1 is of greater priority than 1.3, because 2 is less than 3.

Note that in these priority distribution techniques, the nodes at the same level (e.g., nodes 518-1 and 518-n518 are at the same level, nodes 522-1 and 522-n522 are at the same level), which are referred to as "siblings," have the same priority. Alternatively, and for finer control as mentioned above, the nodes at the same level may have different priorities assigned, such as:

very high priority tactical tier 516: priority 1.1 workload definition 518-1: priority 1.1.1 (priority flows from node 516)

workload definition 518-n518: priority 1.1.n (priority flows from node 516)

In this example, node 518-1 has higher priority than node 518-2. Such assignments may be useful, for example, when one node at a level is consuming so much of the computer memory resource that the other nodes at that level are having trouble meeting their performance goals. In that case, the over-consuming node can be assigned a low priority, or even zero priority, among the nodes at that level, which will allow the under-performing nodes to catch up.

Further, in these examples, the priority of a low-level node may be temporarily elevated (or lowered) by changing its priority number. For example, assume that task 526-n526 is operating at a low priority level and that the system wants to temporarily elevate the priority of that task. The system can temporarily change the priority number of the task to one with a higher priority. This is done without changing the hierarchy and without creating a new hierarchy. The system may set a time limit after which the priority number of the task returns to its original state. Alternatively, the return to the original state may be triggered by another system event, such as the initiation of a task in competition for the computer memory resource.

For very strict controls, a hard memory limit could be specified that would prevent a task from ever consuming more than the specified value, even if other siblings are not consuming their share of memory reservation limits. Such a hard memory limit could override the priority settings described above.

The memory management technique would enforce aggressive memory reclaim when the specified limits are reached for the low priority tasks. For example, suppose that task 526-1 completes its job and no longer needs the memory it had been allocated. The memory management technique would allow the other tasks 526-2 through 526-n526 to consume the computer memory resource previously allocated to task 526-1. Alternatively, the query1/request2 control group 524-1 may release the computer memory resource previously allocated to task 526-1 to the other control groups 524-2 through 524-n524 at its same level or the control group above it in the hierarchy, i.e., workload definition 522-n522 may seize the memory resource for use up the hierarchy.

This technique can be leveraged by using Linux control groups and the memory cgroup subsystem. For other operating system, similar control group mechanisms can be built over the existing memory management kernel modules.

Figure 6:
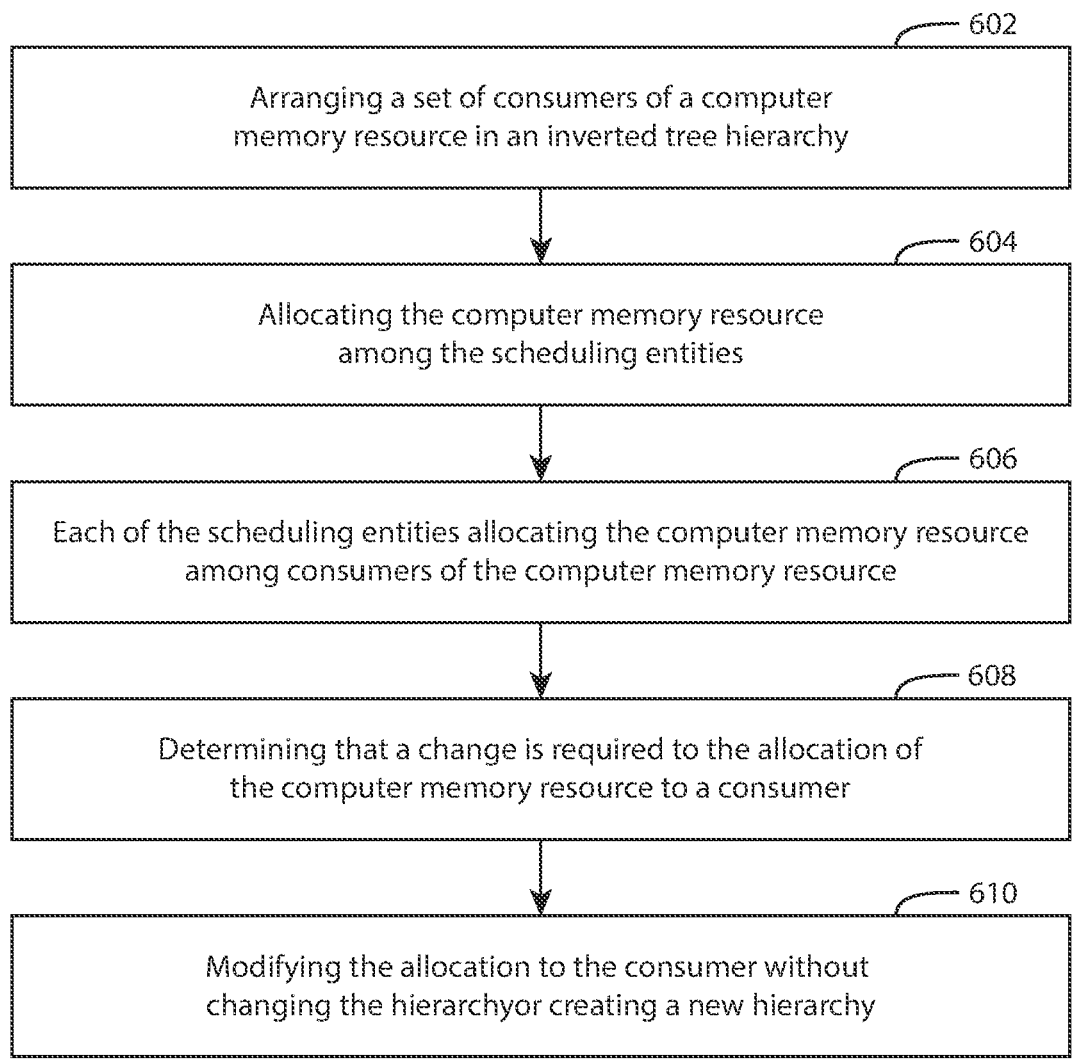
FIG. 6 illustrates a flow chart of a memory management system.

FIG. 6 illustrates a flow chart of a memory management system. A set of consumers of a computer memory resource is arranged in an inverted tree hierarchy 602. The hierarchy has a root, a plurality of branches, a plurality of leaves linked to the branches, and a scheduling entity at each location where a branch couples to the root or to another branch. Each branch is linked to the root or to another branch closer to the root in the hierarchy. Each leaf in the plurality of leaves is a member of the set of consumers of the computer memory resource. The computer memory resource is allocated among the scheduling entities 604. Each of the scheduling entities allocates the computer memory resource among the consumers of the computer memory resource to which it is directly coupled in the hierarchy 606. A modifying scheduling entity in the hierarchy determines that a change is required to the allocation of the computer memory resource to one of the consumers of the computer memory resource for which the scheduling entity is responsible for allocating the computer memory resource 608. The allocation of the computer memory resource to the one of the consumers of the computer memory resource is modified without changing the hierarchy or creating a new hierarchy 610.

Further examples consistent with the present teaching are set out in the following numbered clauses.

Clause 1. A computer-based method comprising:

a memory management computer system arranging a set of consumers of a computer memory resource in an inverted tree hierarchy, the hierarchy having a root, a plurality of branches, a plurality of leaves linked to the branches, and a scheduling entity at each location where a branch couples to the root or to another branch, wherein each branch is linked to the root or to another branch closer to the root in the hierarchy and wherein each leaf in the plurality of leaves is a member of the set of consumers of the computer memory resource;

the memory management computer system allocating the computer memory resource among the scheduling entities;

each of the scheduling entities allocating the computer memory resource among the consumers of the computer memory resource to which it is directly coupled in the hierarchy;

one of the scheduling entities in the hierarchy, a modifying scheduling entity, determining that a change is required to the allocation of the computer memory resource to one of the consumers of the computer memory resource for which the modifying scheduling entity is responsible for allocating the computer memory resource; and modifying the allocation of the computer memory resource to the one of the consumers of the computer memory resource without changing the hierarchy or creating a new hierarchy.

Clause 2. The computer-based method of clause 1 wherein determining that a change is required to the allocation of the computer memory resource to the one of the consumers of the computer memory resource includes determining that the one of the consumers of the computer memory resource is consuming so much of the computer memory resource as to prevent meeting a performance goal by another consumer of the computer memory resource to which allocation of the computer memory resource is made by the modifying scheduling entity.

Clause 3. The computer-based method of any of the preceding clauses wherein modifying the allocation of the computer memory resource to the one of the consumers of the computer memory resource comprises temporarily increasing the allocation of the computer memory resource to the one of the consumers of the computer memory resource.

Clause 4. The computer-based method of any of the preceding clauses wherein modifying the allocation of the computer memory resource to the one of the consumers of the computer memory resource comprises reducing the allocation of the computer memory resource to the one of the consumers of the computer memory resource to zero.

Clause 5. The computer-based method of any of the preceding clauses further comprising increasing the allocation of the computer memory resource to the one of the consumers of the computer memory resource when another consumer of the computer memory resource to which allocation of the computer memory resource is made by the modifying scheduling entity is able to meet a performance goal.

Clause 6. The computer-based method of any of the preceding clauses wherein a branch coupled to the root in the hierarchy is a partition.

Clause 7. The computer-based method of any of the preceding clauses wherein the scheduling entities are control groups.

Clause 8. The computer-based method of any of the preceding clauses wherein the computer memory resource being allocated is a priority of consuming the computer memory resource.

Clause 9. The computer-based method of clause 8 wherein the scheduling entities and leaves are allocated the priority of consuming computer memory in an amount that decreases as the distance along the hierarchy from the root increases.

Clause 10. A non-transitory computer-readable tangible medium, on which is recorded a computer program, the computer program comprising executable instructions, that, when executed, perform a method comprising:

a memory management computer system arranging a set of consumers of a computer memory resource in an inverted tree hierarchy, the hierarchy having a root, a plurality of branches, a plurality of leaves linked to the branches, and a scheduling entity at each location where a branch couples to the root or to another branch, wherein each branch is linked to the root or to another branch closer to the root in the hierarchy and wherein each leaf in the plurality of leaves is a member of the set of consumers of the computer memory resource;

the memory management computer system allocating the computer memory resource among the scheduling entities;

each of the scheduling entities allocating the computer memory resource among the consumers of the computer memory resource to which it is directly coupled in the hierarchy;

one of the scheduling entities in the hierarchy, a modifying scheduling entity, determining that a change is required to the allocation of the computer memory resource to one of the consumers of the computer memory resource for which the modifying scheduling entity is responsible for allocating the computer memory resource; and modifying the allocation of the computer memory resource to the one of the consumers of the computer memory resource without changing the hierarchy or creating a new hierarchy.

Clause 11. The computer-based method of clause 10 wherein determining that a change is required to the allocation of the computer memory resource to the one of the consumers of the computer memory resource includes determining that the one of the consumers of the computer memory resource is consuming so much of the computer memory resource as to prevent meeting a performance goal by another consumer of the computer memory resource to which allocation of the computer memory resource is made by the modifying scheduling entity.

Clause 12. The computer-based method of any of clauses 10-11 wherein modifying the allocation of the computer memory resource to the one of the consumers of the computer memory resource comprises temporarily increasing the allocation of the computer memory resource to the one of the consumers of the computer memory resource.

Clause 13. The computer-based method of any of clauses 10-12 wherein modifying the allocation of the computer memory resource to the one of the consumers of the computer memory resource comprises reducing the allocation of the computer memory resource to the one of the consumers of the computer memory resource to zero.

Clause 14. The computer-based method of any of clauses 10-13 further comprising increasing the allocation of the computer memory resource to the one of the consumers of the computer memory resource when another consumer of the computer memory resource to which allocation of the computer memory resource is made by the modifying scheduling entity is able to meet a performance goal.

Clause 15. The computer-based method of any of clauses 10-14 wherein a branch coupled to the root in the hierarchy is a partition.

Clause 16. The computer-based method of any of clauses 10-15 wherein the scheduling entities are control groups.

Clause 17. The computer-based method of any of clauses 10-16 wherein the computer memory resource being allocated is a priority of consuming the computer memory resource.

Clause 18. The computer-based method of clause 17 wherein the scheduling entities and leaves are allocated the priority of consuming computer memory in an amount that decreases as the distance along the hierarchy from the root increases.

Clause 19. An apparatus comprising:
- a memory management computer system arranging a set of consumers of a computer memory resource in an inverted tree hierarchy, the hierarchy having a root, a plurality of branches, a plurality of leaves linked to the branches, and a scheduling entity at each location where a branch couples to the root or to another branch, wherein each branch is linked to the root or to another branch closer to the root in the hierarchy and wherein each leaf in the plurality of leaves is a member of the set of consumers of the computer memory resource;
- the memory management computer system allocating the computer memory resource among the scheduling entities;
- each of the scheduling entities allocating the computer memory resource among the consumers of the computer memory resource to which it is directly coupled in the hierarchy;
- one of the scheduling entities in the hierarchy, a modifying scheduling entity, determining that a change is required to the allocation of the computer memory resource to one of the consumers of the computer memory resource for which the modifying scheduling entity is responsible for allocating the computer memory resource; and
- modifying the allocation of the computer memory resource to the one of the consumers of the computer memory resource without changing the hierarchy or creating a new hierarchy.

Clause 20. The apparatus of clause 19 wherein the computer memory resource being allocated is a priority of consuming the computer memory resource.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method comprising:
   a memory management computer system arranging a set of consumers of a computer memory resource in a tree hierarchy, the hierarchy having a root, a plurality of branches, a plurality of leaves linked to the branches, and a scheduling entity at each location where a branch couples to the root or to another branch, wherein each branch is linked to the root or to another branch closer to the root in the hierarchy, the computer memory resource being allocated along the tree hierarchy from the root through successive scheduling entities, each scheduling entity allocating the computer memory resource along the tree hierarchy after satisfying its own needs for the computer memory resource, each scheduling entity controlling the allocation of the computer memory resource among the leaves to which it is coupled in the tree hierarchy, wherein each scheduling entity and each leaf in the plurality of leaves is a member of the set of consumers of the computer memory resource, wherein each scheduling entity is a respective computer process that runs on the memory management computer system;
   the memory management computer system assigning each of the scheduling entities and each leaf a respective priority number, wherein the respective assigned priority numbers decline with distance in the hierarchy from the root, and wherein the respective assigned priority of a scheduling entity or a leaf determines the priority of that scheduling entity or leaf in the allocation of the computer memory resource amount the scheduling entities by the memory management computer system;
   the memory management computer system allocating the computer memory resource among the scheduling entities according to respective priority numbers of the scheduling entities;
   each of the scheduling entities allocating the computer memory resource among itself and the consumers of the computer memory resource to which it is directly coupled in the hierarchy; and
   the memory management computer system determining that a under-utilizing scheduling entity is under utilizing its allotted share of the computer memory resource and temporarily setting the priority number of an over-utilizing scheduling entity to the priority number of the under-utilizing scheduling entity, wherein the over-utilizing scheduling entity is at a greater distance along the tree hierarchy than the under-utilizing scheduling entity, without changing the tree hierarchy or creating a new tree hierarchy.

2. The computer-based method of claim 1 further comprising the memory management computer system, upon determining that the under-utilizing scheduling entity is under utilizing its allotted share of the computer memory resource, temporarily setting the priority number of the under-utilizing scheduling entity to the priority number of the over-utilizing scheduling entity.

3. The computer-based method of claim 1 wherein a branch coupled to the root in the hierarchy is a partition.

4. The computer-based method of claim 1 wherein the scheduling entities are control groups.

5. A non-transitory computer-readable tangible medium, on which is recorded a computer program, the computer program comprising executable instructions, that, when executed, perform a method comprising:
   a memory management computer system arranging a set of consumers of a computer memory resource in a tree hierarchy, the hierarchy having a root, a plurality of branches, a plurality of leaves linked to the branches, and a scheduling entity at each location where a branch couples to the root or to another branch, wherein each branch is linked to the root or to another branch closer to the root in the hierarchy, the computer memory resource being allocated along the tree hierarchy from the root through successive scheduling entities, each scheduling entity allocating the computer memory resource along the tree hierarchy after satisfying its own needs for the computer memory resource, each scheduling entity controlling the allocation of the computer memory resource among the leaves to which it is coupled in the tree hierarchy, wherein each scheduling entity and each leaf in the plurality of leaves is a member of the set of consumers of the computer memory resource, wherein each scheduling entity is a respective computer process that runs on the memory management computer system;

the memory management computer system assigning each of the scheduling entities and each leaf a respective priority number, wherein the respective assigned priority numbers decline with distance in the hierarchy from the root, and wherein the respective assigned priority of a scheduling entity or a leaf determines the priority of that scheduling entity or leaf in the allocation of the computer memory resource amount the scheduling entities by the memory management computer system;

the memory management computer system allocating the computer memory resource among the scheduling entities according to respective priority numbers of the scheduling entities;

each of the scheduling entities allocating the computer memory resource among itself and the consumers of the computer memory resource to which it is directly coupled in the hierarchy; and the memory management computer system determining that a under-utilizing scheduling entity is under utilizing its allotted share of the computer memory resource and temporarily setting the priority number of an over-utilizing scheduling entity to the priority number of the under-utilizing scheduling entity, wherein the over-utilizing scheduling entity is at a greater distance along the tree hierarchy than the under-utilizing scheduling entity, without changing the tree hierarchy or creating a new tree hierarchy.

6. The computer-based method of claim 5 further comprising the memory management computer system, upon determining that the under-utilizing scheduling entity is under utilizing its allotted share of the computer memory resource, temporarily setting the priority number of the under-utilizing scheduling entity to the priority number of the over-utilizing scheduling entity.

7. The computer-based method of claim 5 wherein a branch coupled to the root in the hierarchy is a partition.

8. The computer-based method of claim 5 wherein the scheduling entities are control groups.

9. An apparatus comprising:
a memory management computer system, comprising a hardware processor and a non-transitory computer-readable storage medium, the memory management computer system arranging a set of consumers of a computer memory resource in a tree hierarchy, the hierarchy having a root, a plurality of branches, a plurality of leaves linked to the branches, and a scheduling entity at each location where a branch couples to the root or to another branch, wherein each branch is linked to the root or to another branch closer to the root in the hierarchy, the computer memory resource being allocated along the tree hierarchy from the root through successive scheduling entities, each scheduling entity allocating the computer memory resource along the tree hierarchy after satisfying its own needs for the computer memory resource, each scheduling entity controlling the allocation of the computer memory resource among the leaves to which it is coupled in the tree hierarchy, and wherein each scheduling entity and each leaf in the plurality of leaves is a member of the set of consumers of the computer memory resource, wherein each scheduling entity is a respective computer process that runs on the memory management computer system;

the memory management computer system assigning each of the scheduling entities and each leaf a respective priority number, wherein the respective assigned priority numbers decline with distance in the hierarchy from the root, and wherein the respective assigned priority of a scheduling entity or a leaf determines the priority of that scheduling entity or leaf in the allocation of the computer memory resource amount the scheduling entities by the memory management computer system;

the memory management computer system allocating the computer memory resource among the scheduling entities according to respective priority numbers of the scheduling entities;

each of the scheduling entities allocating the computer memory resource among itself and the consumers of the computer memory resource to which it is directly coupled in the hierarchy; and the memory management computer system determining that a under-utilizing scheduling entity is under utilizing its allotted share of the computer memory resource and temporarily setting the priority number of an over-utilizing scheduling entity to the priority number of the under-utilizing scheduling entity, wherein the over-utilizing scheduling entity is at a greater distance along the tree hierarchy than the under-utilizing scheduling entity, without changing the tree hierarchy or creating a new tree hierarchy.

\* \* \* \* \*